Jan. 12, 1937.  H. E. IMES  2,067,450
MELTING PITCH
Filed June 3, 1930  3 Sheets—Sheet 2
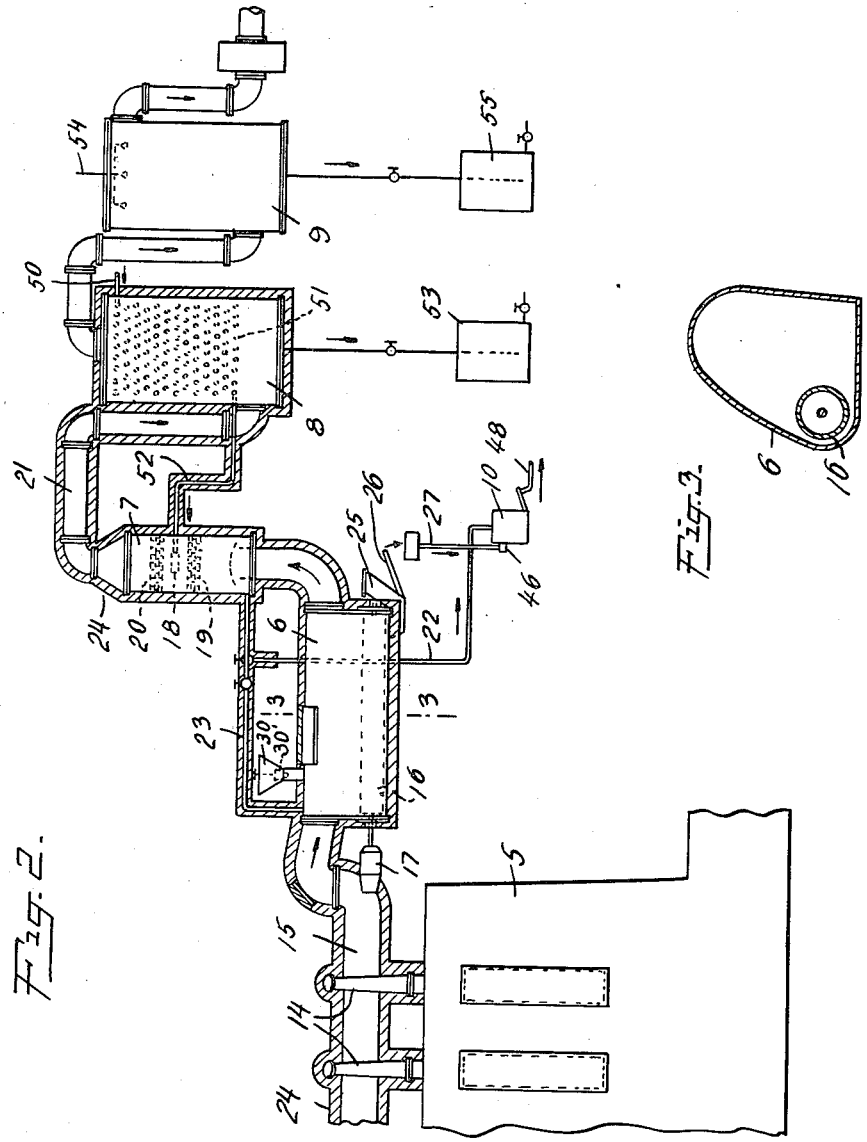
INVENTOR
Harold Everett Imes
BY
Pennie Davis Marvin & Edmonds
ATTORNEYS Jan. 12, 1937.   H. E. IMES   2,067,450
MELTING PITCH
Filed June 3, 1930   3 Sheets-Sheet 3
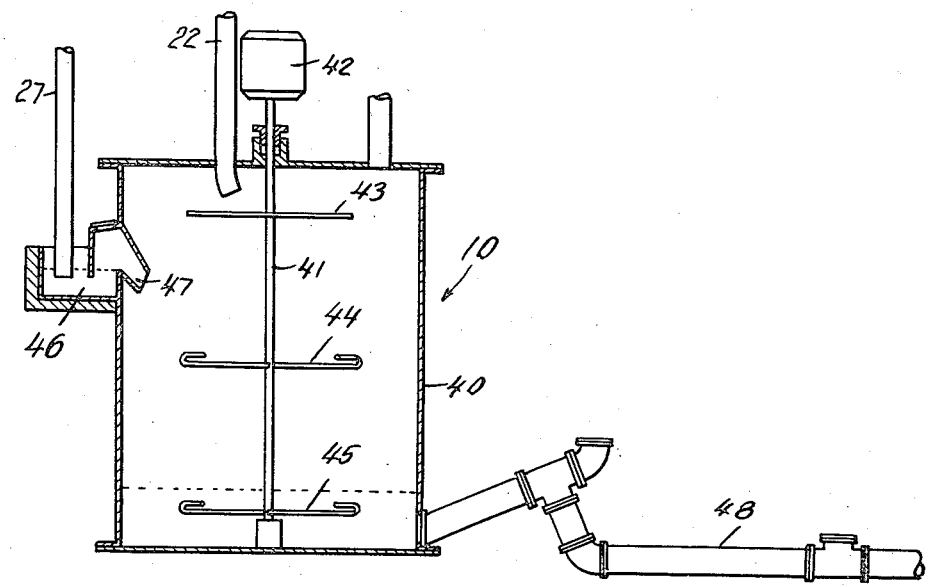
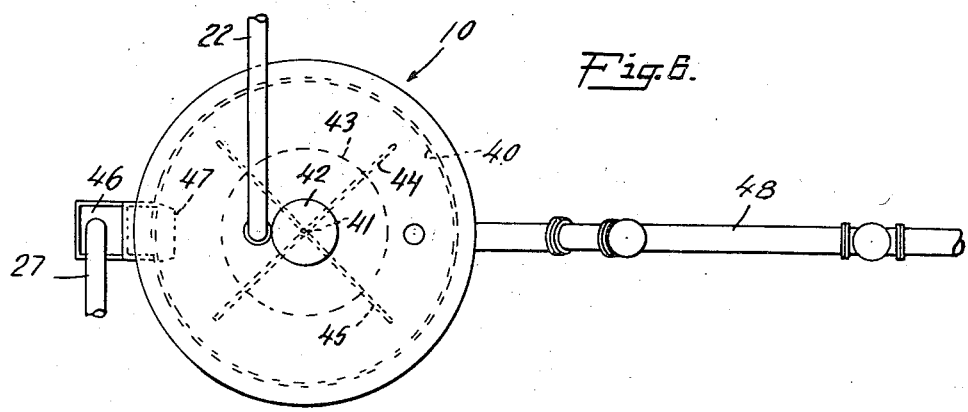
INVENTOR
Harold Coonett Imes
BY
Pennie Davis Marvin + Edmonds
ATTORNEYS Patented Jan. 12, 1937

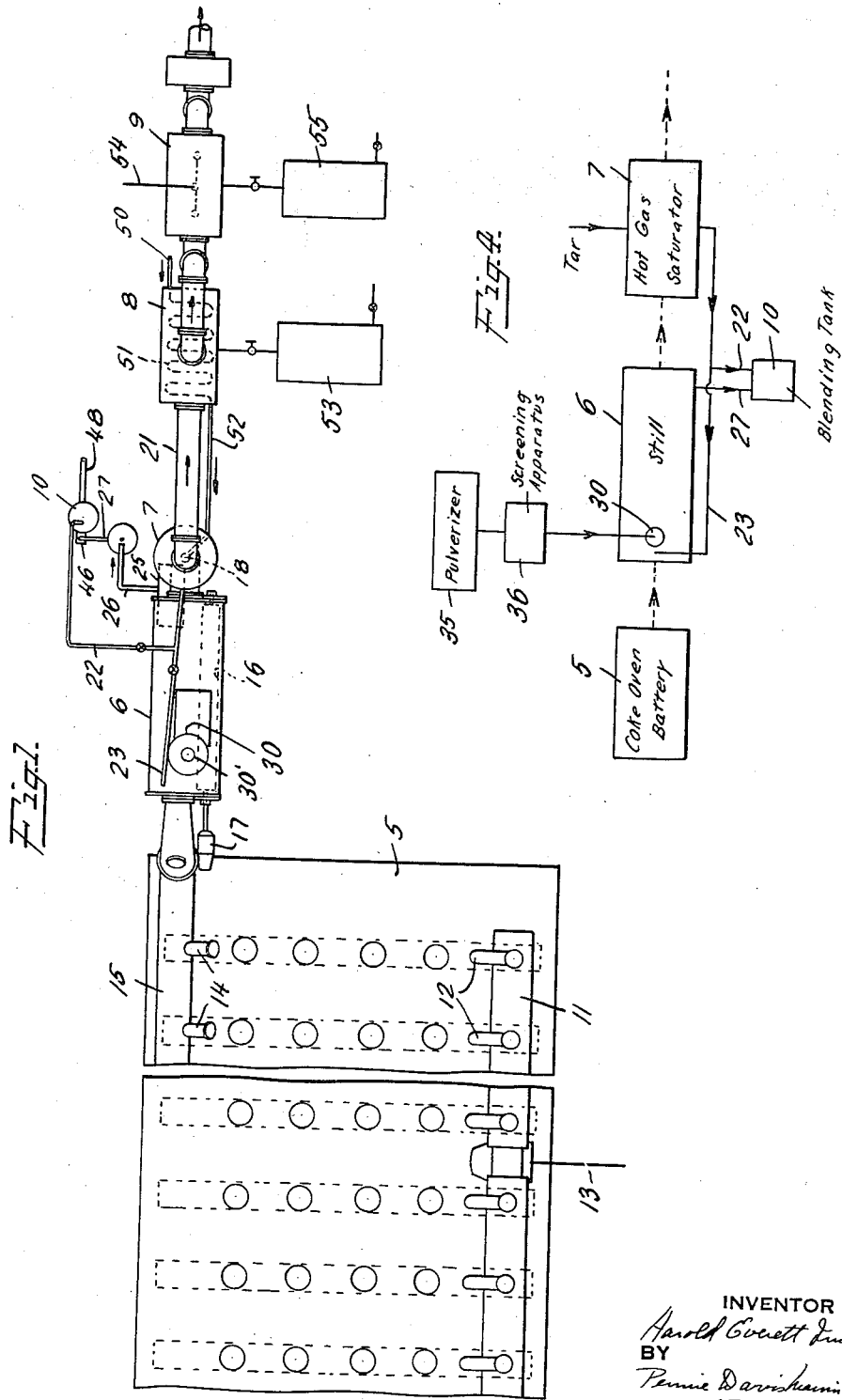

2,067,450

UNITED STATES PATENT OFFICE 2,067,450

MELTING PITCH

Harold Everett Imes, Ashland, Ky., assignor to The Barrett Company, New York, N. Y., a corporation of New Jersey Application June 3, 1930, Serial No. 459,083

11 Claims. (Cl. 202—64)

This invention relates to the melting of pitch of high melting point, and more particularly to the melting of such pitch in a body of hot flux heated by direct contact with hot gases. The invention includes the blending of this pitch to be melted with the flux, and where the flux is tar or partially distilled tar, the blending of this pitch with the tar and distilling the blend to produce a blended pitch product, and further includes both the apparatus and the process.

According to this invention high melting point pitch in solid form is added to and melted in a body of heated flux such as tar or pitch. The flux and such pitch as is dissolved therein are sprayed into hot gases during the solution of the pitch, and in this way heat is supplied to the mixture and the pitch is dissolved in the flux. The liquid is sprayed and resprayed into the hot gases in the form of a fine intense spray and the liquid surrounding any unmelted pitch is violently agitated so that the heat of the gases is quickly transferred to the unmelted pitch without exposing any portion of the pitch or flux to the heat of the hot gases for any prolonged period of time. Those walls of the vessel in which the pitch is melted with which the hot gases come in contact are continuously sprayed with the liquid to prevent any accumulation of flux or pitch thereon and subsequent conversion of such flux or pitch to coke by prolonged contact with the hot gases.

The pitch is added to the flux preferably in finely divided form and in a continuous manner and it is added at such a rate that at no time is there enough solid pitch mixed with the liquid contents of the still to prevent agitation and spraying of the liquid into the hot gases. The flux also is advantageously added in a continuous manner and the pitch product may be drawn off continuously.

The flux may be pitch of the same melting point as the pitch added to the still and the body of heated flux may be produced from such high melting point pitch by melting it in the still. It is not necessary that both the flux and the pitch be separately added to the still as the pitch when melted may serve as the flux, and in this case the pitch alone will be added to the still in finely divided form and the pitch will be drawn off from the still in melted form.

The pitch may be blended with a flux without any substantial distillation of the flux. As an alternative method the flux may be distilled during the blending operation by the heat of the gases and a blended pitch product of any desired melting point may be produced. When no substantial distillation of the flux is desired, sufficient pitch is added to the flux to prevent the temperature of the flux rising above that at which any substantial distillation will take place. The temperature and amount of the gases employed for heating the mixture and the nature of the spray produced in these gases, i. e. the intensity of the spray and the fineness of the spray, etc., are so regulated that the liquid sprayed into the gases is heated without undergoing any substantial distillation.

When tar is employed as the flux, it may be distilled in the same operation with the melting and blending of the pitch. The melting and blending and distilling operations are then carried out in a still and the rate at which the solid pitch is added to the still, the temperature of the gases and the nature of the spray of liquid produced in the gases, etc., are so controlled that the flux together with any pitch which may be dissolved therein and blended therewith is distilled by the hot gases as it is sprayed into them. The pitch resulting from such distillation blends with the pitch added to the still and a blended pitch product is produced.

This invention presents a novel method of melting a pitch of high melting point. The flux in which the pitch is melted may be pitch of a melting point the same as that of the pitch being melted, or pitch of higher or lower melting point, or tar which may be raw tar or dehydrated tar or stripped tar or semi-pitch. It is difficult by any known practicable method to melt coal tar pitch with a melting point of 225° F. or higher on a commercial scale without an undesirable amount of decomposition, and it is impossible, or almost impossible, to melt coal tar pitch with a melting point of 350° F. or 400° F. on a commercial scale by any known practicable method. By crushing such pitch and adding it to a body of heated flux, according to this invention, it may readily be melted and a desired pitch product may be produced.

The demand for coal tar distillation products is not uniform throughout the year. During the spring and summer months, for example, there is a large demand for road tar. This is a large tonnage product and affords an outlet for a large quantity of pitch. Road tar may advantageously be prepared from pitch of a high melting point by blending it with a road tar flux such as dehydrated tar or a semi-pitch. At plants where road tar is prepared in this way a considerable quantity of high melting point pitch may accumulate during the winter months when the demand for road tar is low. Pitch of high melting point thus produced during the winter months may be stored in any suitable form and during those months when the demand for road tar is high, as during the summer months, the high melting point pitch may be crushed and melted in tar or pitch according to this invention. The high melting point pitch may be blended directly with the road tar flux. According to a preferred method of carrying out the invention, the high melting point pitch is melted in and blended with tar in a still while the tar is being subjected to distillation therein. A pitch of high melting point is produced which is then blended with road tar flux such as dehydrated tar or semi-pitch to produce the road tar desired, and it is advantageously blended therewith while it is still hot and thinly fluid.

When pitch of a high melting point produced by the distillation of tar is melted in a still and blended with tar of the same composition while the tar is being subjected to distillation therein, the pitch produced is a pitch of higher free carbon content than would be produced by the straight distillation of this same tar. This process of adding high melting point pitch to the still during the distillation of tar with production of a blended pitch product therefore presents a method of producing high carbon pitches. The increase in carbon content may be due to decomposition of the pitch constituents, which results from reheating the pitch to a high temperature.

The word "tar" is used in this patent to include raw tar, dehydrated tar and stripped tar from which a part of the more volatile constituents have been removed, e. g. semi-pitch.

The invention is particularly adapted to distilling operations in which tar is distilled by direct contact with such hot gases as steam, coal distillation and gasification gases, etc. It may be carried out in ordinary tank stills and other types of stills in which suitable spraying means is provided and thru the vapor space of which hot gases are passed.

The production of melted pitch of high melting point in a single still may be greatly increased by the process of this invention, and where blended pitches are to be formed from such high melting point pitches, as by blending with a flux to produce a road tar or roofing pitch, the capacity of the plant to produce such high melting point pitches over a limited period of time may also be increased.

The invention is applicable to the treatment of pitches of high melting point, i. e. pitches with a melting point of 225° F. or higher, and particularly to pitches with a melting point of, for example, 350° F. or 400° F., which, at ordinary temperatures, are solid, and may readily be stored, and may thereafter be readily crushed or ground before being returned to the still.

The pitch added to the still during a tar distilling operation may be pitch of the same melting point as that of the pitch product produced or pitch of a higher or lower melting point may be added to the still and blended with the tar therein to produce pitch of a different melting point.

Although the invention is described more particularly as applied to the addition of pitch to a still in which coke oven tar is being distilled, and pitch from such tar is added to the still, it is also applicable to the addition of pitches of different origin to a still in which coke oven tar is being distilled, and to the addition of pitch from coke oven tar or from other sources to a still in which a tar other than coke oven tar is being distilled, such as gas house tar, etc.

The invention will be further described in connection with the accompanying drawings, but it is intended and is to be understood that the invention is not limited thereto:

Fig. 1 is a plan view of a still operated in connection with a coke oven plant;

Fig. 2 is an elevation of the apparatus shown in Fig. 1;

Fig. 3 is a cross-section through the still;

Fig. 4 is a flow sheet; and

Figs. 5 and 6 are an elevation and plan of the pitch blending apparatus of Figs. 1 and 2.

The apparatus shown comprises a coke oven battery 5, a still 6, a hot gas saturator 7, a heat interchanger 8, a direct condenser 9, and a pitch-blending tank 10.

The coke oven battery is equipped with a collector main 11 which is connected in the usual way through uptake pipes 12 with individual ovens of the battery, and thru the cross-over main 13 to condensers, etc. (not shown).

The still 6 is located on the opposite side of the coke oven plant from the collector main 11. Selected ovens of the battery are connected thru uptake pipes 14 and a header 15 with the still 6. By proper manipulation of valves in the uptake pipes 14, and valves in the uptake pipes 12 connected with these same ovens, the gases from these ovens may be directed either to the collector main 11 or thru the hot gas header 15 into the still 6.

The still 6 is equipped with a tar spraying device which comprises a roll 16 and the motor 17. The motor rotates the roll at a high speed, for example, 900–1200 R. P. M., and sprays tar and pitch from the bottom of the still 6 up into the hot coke oven gases passing thru the still. The tar is distilled by direct contact with the hot gases and pitch of any desired melting point is produced.

The hot gases and vapors resulting from this distillation pass to the hot gas saturator 7. In this hot gas saturator they are sprayed with preheated tar from the nozzle 18. Baffles 19 and 20 are provided below and above this tar spray to remove entrained particles of spray from the gases and to expose a large surface of the tar sprayed from the nozzle 18 to the distilling action of the hot gases and vapors. The roll 16 throws a fine intense spray of tar and pitch into the gases and the gases are substantially detarred. Any large particles of the spray from the roll or from the nozzle 18, which are carried by the gases, are removed by the baffles 19 and 20 so that the gases leaving the hot gas saturator thru the line 21 are substantially free from any entrained particles. The tar sprayed into the gases thru the nozzle 18 is partially distilled and a semi-pitch is produced in the saturator 7. The drawings show means for utilizing a portion of this semi-pitch as road tar flux for blending with the hard pitch from the still by drawing off a portion of it thru the line 22 into the blending apparatus 10. The balance of the semi-pitch is conveyed to the still 6 thru the line 23 and used as the flux in which the pitch is melted. The uptake pipes 14, the hot gas header 15, the still 6 and the saturator 7 are advantageously heavily insulated as indicated at 24.

The flux, i. e. the semi-pitch and the melted pitch of high melting point are sprayed and resprayed into the gases in the still 6 by the roll 16. The blended pitch product produced is drawn off thru the trap 25 and the levelling arm 26. The position of the levelling arm determines the level of the liquid maintained in the still and thus the nature of the spray produced. The blended pitch product drawn off from the still may be handled in any suitable manner. Where it is to be sold as a high melting point pitch product, it may advantageously be formed into flakes or granules as it leaves the still. For this purpose a trough with a spray of cold water in the trough for chilling and granulating the pitch may be used to advantage, or the pitch may be run on to a steel belt and cooled thereon to form flakes. The drawing shows apparatus for blending the pitch product with semi-pitch from the saturator.

This pitch product is drawn off from the still thru the pipe 27 into the mixing tank 10, where it is blended with semi-pitch from the line 22. Instead of employing semi-pitch, tar may be used as the road tar flux in this blending operation.

Any blending apparatus suited to the handling of pitch of the melting point produced, may be employed. The blending vessel shown is of the type described in patent application Serial No. 382,375, filed July 31, 1929, and the blending apparatus may be operated in the manner there described.

The still 6 is provided with suitable means for adding pulverized pitch of high melting point during the distilling operation. The pulverized pitch may be added thru the funnel 30, the outlet from which may be closed by the removable plug 30'.

Fig. 4 is a flow sheet indicating in a diagrammatic way the flow of material thru the still 6 and the blending tank 10. The hot gases and vapors from the coke oven battery 5 flow into the still 6 and thence to the saturator 7. The hot gases and vapors pass from the saturator 7 to condensers (shown in Figs. 1 and 2). The flow of gases and vapors is shown in dotted lines in Fig. 4. Tar which is preheated in the heat interchanger enters the saturator thru line 52. It is partially distilled in the saturator. A portion of the semi-pitch produced is drawn off thru the line 22 to the mixing tank. The balance is conveyed thru the line 23 to the still. The hard pitch is pulverized in the pulverizer 35. It is screened at 36 and then fed thru the funnel 30 into the still 6.

The hard pitch is melted within the still and is dissolved in the tar to be distilled, and the blended mixture is sprayed and resprayed into the hot gases and distilled therein. The resulting pitch, which, according to a preferred method of operation, is a pitch of high melting point, is drawn off thru the line 27 to the blending tank 10. Here it is blended with semi-pitch from the saturator 7. By properly regulating the blending operation, a relatively high carbon pitch for road treating purposes or a pitch of higher melting point suitable for roofing may readily be prepared.

The mixing tank shown comprises a shell 40 and a stirring arm 41 driven at relatively high speed by the motor 42. On the stirring arm are fastened a plate 43 and two arms 44 and 45 which are at right angles to one another. The high melting point pitch is fed into the blending tank thru the cup 46 over the lip 47. It falls into the bottom of the tank without forming a wash layer on the shell 40. The road tar flux, i. e. the semi-pitch from the saturator, enters the mixing tank thru the line 22 and falls on to the rapidly rotating plate or disc 43. This disc sprays the flux on to the walls of the mixing tank and the road tar flux continually washes down the walls of the mixing tank and prevents any hard pitch from collecting on these walls. The stirring arm 44 breaks the stream of high melting point pitch and somewhat disperses it and also prevents the formation of any large quantity of foam within the mixing tank. The arm 45 stirs the mixture of road tar flux and high melting point pitch which forms in the bottom of the tank and imparts a swirling motion to this body of liquid. The high melting point pitch blends with the mixture of high melting point pitch and road tar flux in the bottom of the tank, which is continuously swirled by the stirring arm 45. The road tar flux washes down the walls of the blending tank and gradually blends from the circumference with the mixture of semi-pitch and pitch maintained in the bottom of the tank. In this way the road tar flux is gradually blended with the high melting point pitch, and the high melting point pitch blends with the road tar flux without being over cooled and without hardening. A homogeneous mixture suitable for use on roads is produced. The pitch formed is drawn off thru the line 48.

The tar sprayed into the gases in the saturator is preheated by indirect contact with the hot gases and vapors in the heat interchanger 8. This tar enters the heat interchanger thru the pipe 50. It is preheated in the coil 51 and conveyed by the line 52 to the saturator. The gases and vapors coming from the saturator are cooled simultaneously with the preheating of the tar, and oil which condenses from the gases is collected in the tank 53 as a clean oil product.

The gases and vapors leaving the heat interchanger are further cooled in the condenser 9. This may be a direct condenser in which the gases and vapors are sprayed with ammonia liquor from the pipe 54. The ammonia liquor and clean low boiling oil from the condenser 9 are drawn off into the decanter 55 and from this decanter the oil and ammonia liquor may be separately collected. The oil may be blended with the oil collected in tank 53 to form a marketable creosote oil. An exhauster 56 is provided for drawing the gases thru the still and condensing system. Beyond the exhauster, means for the recovery of ammonia, light oils, etc. may be provided.

According to a preferred method of carrying out the invention, pitch with a melting point of approximately 400° F. produced by the distillation of coke oven tar is added to the still. This pitch may be produced during the winter months in the still 6 and may be stored in any suitable manner. Then in the spring and summer, when the demand for road tar is large, this high melting point pitch is crushed and pulverized and then screened. Pitch which passes through a one-eighth inch screen is fed to the still 6. Coke oven tar from the collector main 11 and the condensers connected with the cross-over main 13 is distilled in the still and the pitch is added to the still during the distillation of this tar. The tar, which according to the preferred form here described, is a coke oven total tar, is preheated in the heat interchanger 8 and then partially distilled in the saturator 7. Where desirable only a heavy tar fraction or a light tar fraction may be distilled instead of the total tar. The semi-pitch produced in the saturator, which is a partially distilled tar or pitch with a melting point lower than that of the final road-tar or blended pitch product, is drawn off from the saturator 7 and a portion is delivered to the mixing tank and the balance is further distilled in the still 6. A still of the type here shown (which includes a still with a spray roll and a saturator), equipped for producing pitch with a melting point of 400° F., at the rate of approximately one gallon per minute and having a capacity of, for example, 6500–7200 gallons of road-tar per day under ordinary operating conditions, may be operated according to this invention to produce ten thousand gallons of road tar per day. 400° F. melting point pitch in finely ground form may be added to the still at the rate of about one-half gallon per minute.

In producing road tar or pitch according to the usual method of operation, 80 gallons of semi-pitch from the saturator 7 are blended with 20 gallons of pitch with a melting point of about 400° F. produced from the straight distillation of coke oven tar in the blending tank 10 to produce road tar with a melting point of about 105° F. When the capacity of the still is increased as above described by adding high melting point pitch to the still, the semi-pitch from the saturator and high melting point pitch from the still may be blended in approximately the same proportions. The proportions employed will vary depending upon the melting point of the semi-pitch. The amount of heat used in the still 6 is greater per gallon of tar fed to the still when high melting point pitch is added to the still so that the gases and vapors leaving the still would ordinarily be at a lower temperature than when no hard pitch is added to the still, but this may at least in part be compensated for by adding a greater portion of the semi-pitch from the bottom of the saturator to the blending tank for blending with the greater quantity of high melting point pitch delivered from the still.

By blending a greater proportion of semi-pitch or blending pitch of lower melting point, the conditions will be varied and a blended pitch suitable for roofing may be produced, having preferably a melting point in the neighborhood of 145° F.

The pitch produced in the still is a higher free carbon pitch than straight run pitch produced by the straight distillation of tar and the blended product is therefore a high free carbon road tar or other blended product. This is desirable in a road tar and most road tar specifications call for a high free carbon content.

Pitches of various melting points can be produced in the still 6 and pitches of different origin and different melting point may be added to the still in finely pulverized form. By properly controlling the blending operation, different blended products may be produced. Although the invention is described more particularly as applied to the distillation of tar by hot coke oven gases, it is applicable to other distilling operations such as distilling in hot gas retort gases, steam, etc.

I claim:

1. The method of melting pitch of high melting point which comprises melting a portion of the pitch, crushing the balance of the pitch and gradually adding it to the melted pitch thereby melting it while spraying the melted pitch into gases of higher temperature than the melted pitch.

2. The method of melting pitch of high melting point and producing a melted pitch product, which comprises pulverizing the pitch, dissolving the pitch in tar, and subjecting the blended product thus produced to distillation by contact with hot gases.

3. The method of melting coal tar pitch of high melting point and producing a melted pitch product, which comprises pulverizing the pitch and continuously adding the pulverized pitch to a body of coal tar while spraying the tar into a current of hot gases thereby melting the pitch by heat conveyed to it by the tar.

4. The method of producing road tar from tar and solid pitch in apparatus comprising a tar still, a saturator and a blending tank, which comprises passing hot gases thru the tar still to the saturator, feeding tar to the saturator and partially distilling it therein, drawing off a portion of the semi-pitch produced in the saturator to the blending tank, feeding the balance of the semi-pitch to the still, adding solid pitch to the still, dissolving the solid pitch therein in the tar and spraying the liquid contents of the still into the hot gases whereby the tar is distilled and pitch of a high melting point is produced, and drawing off the high melting point pitch and blending it with the semi-pitch in the blending tank so as to produce road tar.

5. The method of distilling tar, which comprises supplying the tar to a still, passing hot coke oven gases thru the still, adding pulverized pitch with a melting point of 350 or 400° F. or higher to the still, melting the pitch in the still and dissolving it in the tar to form a blended mixture, spraying and respraying the liquid contents of the still into the hot gases whereby the tar is distilled and a pitch product with a melting point of 350° F. or higher is produced.

6. The method of producing pitch from tar, which comprises distilling a portion of the tar to pitch of high melting point, solidifying the pitch, pulverizing the pitch, adding the pulverized pitch to the balance of the tar, and distilling the mixture to pitch.

7. Apparatus for melting pitch which comprises a vessel, means for passing hot gases therethru, a flux feed, means for feeding solid pitch to the vessel, a pitch draw-off, and means in the vessel for spraying the liquid contents of the vessel into the gases passing therethru.

8. Apparatus for producing pitch, which comprises a still, means for passing hot gases thru the still, a tar feed to the still, means for introducing pulverized pitch in solid form to the still, means for withdrawing pitch therefrom, means for spraying the liquid contents of the vessel into the gases passing therethru and a condenser for cooling the gases and vapors coming from the still.

9. Apparatus for producing pitch and blending the pitch with a flux, which comprises a still, means for supplying tar to the still, means for introducing pulverized pitch in solid form into the still, means for passing hot gases into the still, spray means in the still for spraying the tar and the pitch into direct contact with the hot gases, a blending tank, means for drawing pitch off of the still and introducing it into the blending tank, and means for introducing the flux into the blending tank and for blending the flux and pitch therein.

10. A still, means for introducing hot gases into the still, a saturator, means for spraying tar into the saturator, means for passing hot gases and vapors from the still into the saturator and distilling the tar to semi-pitch therein, a blending tank, means for drawing off a portion of the semi-pitch produced in the saturator to a blending tank, means for delivering the balance of the semi-pitch to the still, means for introducing pulverized pitch in solid form into the still, a spray roll in the still with means for rotating the roll to produce a fine intense spray of tar and melted pitch in the still, and means for withdrawing pitch from the still, and introducing it into the blending tank.

11. In combination with a coke oven battery, a still, means for passing hot coke oven gases from selected ovens of the battery into the still, a spray roll in the still with means for rotating it at a high speed, means for introducing finely pulverized pitch into the still in solid form, and a gas and vapor outlet and a pitch draw-off from the still.

HAROLD EVERETT IMES.